Figure 1:
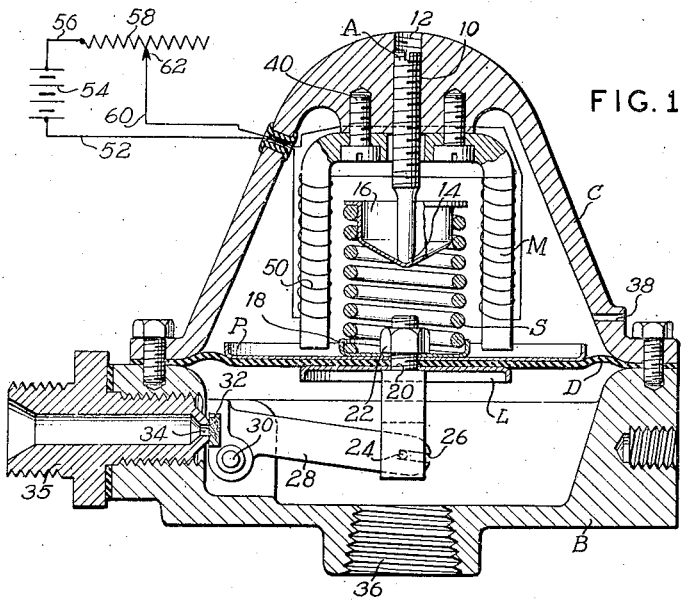

Oct. 29, 1940.  H. W. CARNES  2,219,441

APPARATUS FOR CONTROLLING FLUID PRESSURE

Filed Nov. 6, 1937

INVENTOR
HERMAN W. CARNES
BY
E. L. Greenewald
ATTORNEY

Patented Oct. 29, 1940

2,219,441

UNITED STATES PATENT OFFICE 2,219,441

APPARATUS FOR CONTROLLING FLUID PRESSURE

Herman W. Carnes, Indianapolis, Ind., assignor to Oxweld Acetylene Company, a corporation of West Virginia Application November 6, 1937, Serial No. 173,093

4 Claims. (Cl. 50—23)

This invention relates to apparatus for controlling the pressure of fluids passing through fluid pressure regulators, and more particularly to a diaphragm-actuated regulator or pressure reducing valve including an improved loading mechanism imparting superior operating characteristics to the regulator. The invention is particularly adapted for use with gases, but may also be used in connection with vapors or liquids.

In regulators of the type equipped with spring-loaded, pressure-responsive diaphragms, the expansive force of the spring decreases as the latter lengthens. Consequently, the spring pressure acting upon the diaphragm is not constant throughout the travel of the latter. It is usually desirable to maintain this spring pressure at least at a substantially constant value throughout the limit of travel of the diaphragm and sometimes to even increase it as the spring expands to move the diaphragm in a valve opening direction.

For example, in a diaphragm-actuated gas regulator, an increase in load demand on the regulator usually causes a decrease in flow or discharge pressure. When a large load is imposed upon the regulator, an increase in discharge pressure would be desirable to compensate for greater frictional losses in piping. Various means hitherto devised to accomplish these purposes have proven unsatisfactory due to being unduly complicated in construction or unreliable in operation.

In order to obtain the optimum performance in a regulator, it is desirable to maintain the lock-up, or shut-off, pressure at a relatively low value. Prior attempts to achieve this desirable operating characteristic have been generally unsuccessful since, if a spring of sufficiently low strength to permit the lock-up pressure to be low has been utilized in the regulator, the spring has not been powerful enough to maintain the desired operating pressure. Substantially the same difficulty has been encountered in attempts to reduce the lock-up pressure of weight-loaded pressure regulators.

It is therefore among the objects of this invention to provide an improved diaphragm-actuated fluid pressure regulator which is simple in construction, reliable in operation, economical to manufacture; and which includes a diaphragm loading mechanism embodying a novel means cooperable therewith to impart superior operating characteristics to the regulator, to permit these operating characteristics to be varied, to lower the lock-up pressure of the regulator and to permit remote control of the diaphragm loading of the regulator.

Figure 2:
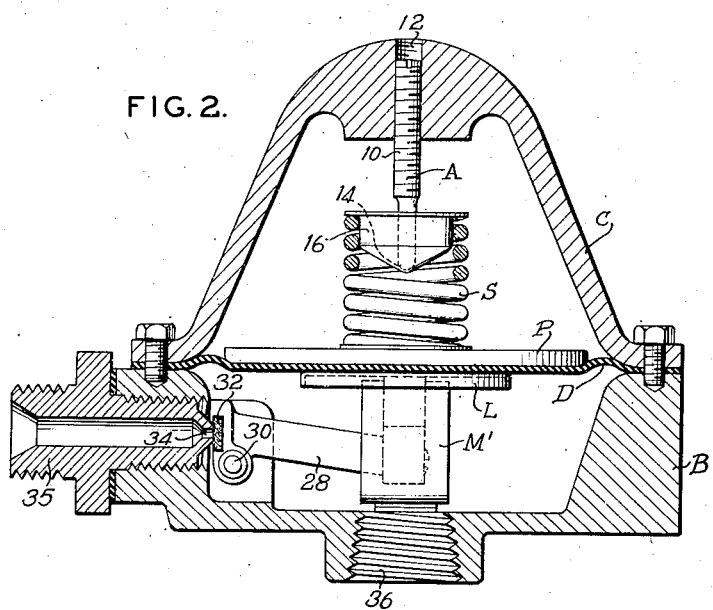

These and other objects of the invention will in part be apparent and in part become obvious from the following description when read in connection with the accompanying drawing, in which:

Fig. 1 is a sectional view through a fluid pressure regulator embodying the invention; and Fig. 2 is a sectional view of a regulator illustrating another embodiment of the invention.

In the improved regulator embodying this invention some part of the diaphragm means, such as the diaphragm itself, or some part connected thereto, such as a diaphragm pan, spring seat or valve actuating lever, is constructed of magnetic material, such as ferrous metal or other suitable metals. A magnetic field is then impressed directly on the diaphragm means, as by a permanent magnet, electro-magnet or solenoid winding, mounted in the regulator with at least one pole face in adjacent magnetically operative relation to the magnetic part of the diaphragm means so that the diaphragm means is always within the magnetic field of the magnet.

It is well known from the study of electrophysical phenomena that the strength of a magnetic field varies substantially inversely as the square of the distance from the pole faces of a magnet, and that the pole strength of an electromagnet is substantially directly proportional to the current flowing through its winding. Utilizing these principles, it is possible to arrange a source of magnetism with respect to the type of diaphragm above described, and to adjust this source with relation to the diaphragm loading mechanism, so that the operating characteristics of the loading mechanism may be varied within a wide range. Thus, the effective force of the loading mechanism on the diaphragm may be maintained substantially constant within the limits of diaphragm motion, may be increased as the demand on the regulator increases to compensate for greater frictional losses in pipes due to the increased load, or may be otherwise varied. If the type of fluid passing through the regulator permits, an electromagnet or solenoid coil having a variable intensity of magnetic force may be used and the diaphragm loading of the regulator varied by remote control.

Furthermore, the magnetic field and the loading mechanism may be arranged so that they cooperate to maintain the lock-up pressure of the regulator at a low value without decreasing the desired operating pressure.

A fluid pressure regulator illustrating the principles of the invention is shown in Fig. 1 and comprises a body B and a cap C between which is secured a flexible pressure-responsive diaphragm D forming part of a diaphragm means. The loading mechanism or means for the diaphragm D may, in this instance, comprise a spring S and an adjusting means A. The adjusting means A includes a screw 10, threadedly engaging an aperture 12 in the cap C and formed with a rounded lower end 14 abutting a spring seat 16 resting on the upper end of spring S. At its lower end, spring S engages a second spring seat 18, secured against an upper diaphragm pan P engaging the upper side of diaphragm D. A lower diaphragm pan L engages the under side of the diaphragm, and a bolt 20 and nut 22 serve to secure the pans P and L and the spring seat 18 to the diaphragm D. The diaphragm pans P and L, which form part of the above-mentioned diaphragm means are preferably formed of ferrous metal or other magnetic material.

The lower end of the bolt 20 is forked and a pin 24, extending between the arms of the fork, engages an open-ended slot 26 formed in an arm 28 pivoted to the body B as at 30. At its opposite end arm 28 is provided with a valve seat 32 adapted to engage and close the inlet port 34 of a nipple 35 mounted in the body B. The body B is further provided with an outlet port 36, which is threaded to receive a suitable connection for conveying fluid from the regulator. The cap C has an aperture 38 therein whereby the upper side of diaphragm D is exposed to atmospheric pressure. The under side of the diaphragm is in contact with fluid passing through the regulator whereby the diaphragm is movable responsively to the pressure of such fluid.

To improve the operating characteristics of the above described regulator, a source of magnetism is preferably mounted therein in such a position that the magnetic part or parts of the diaphragm means are within the magnetic field created. This magnetic field then influences the movement of the diaphragm conjointly with the diaphragm loading mechanism.

In the embodiment of the invention illustrated in Fig. 1, a magnet M, which, although shown as an electromagnet, may be either a permanent magnet or an electromagnet, is secured in the cap C by bolts 40. The magnet is desirably so located and constructed that it straddles the spring S and has pole faces in directly adjacent magnetically operative relation to the diaphragm D and the pans P and L that the latter are always within the magnetic field of the magnet. One end of the magnetizing winding 50 of the magnet M is connected by a conductor 52 to one side of a suitable source of electric energy such as a battery 54. The opposite side of the battery 54 is connected by a conductor 56 to one side of a current adjusting means such as a resistance 58. The opposite end of winding 50 is connected through a conductor 60 to the movable connection 62 of the current adjusting means 58. The conductors 52 and 60 extend through a gas-tight seal 63 in the cap C. The source of current 54 and the current adjusting means 58 may be located at any desired distance from the regulator so that the effective diaphragm loading of the latter may be varied at will by remote control.

With this construction, the screw 10 is turned so that the spring S will exert a definite repulsive force against the diaphragm D. The magnet M if it is a permanent magnet, will concurrently exert a predetermined attractive force upon the diaphragm. If the magnet M is an electromagnet, its energization may be varied or adjusted through manipulation of the current adjusting means 58. When the load increases and the fluid pressure in body B drops, the diaphragm will move away from the pole faces of the magnet under the influence of the spring S. As the strength of the magnetic field decreases substantially as the square of the distance from the pole faces of the magnet, the attractive influence of the magnet on the diaphragm will proportionally and rapidly decrease as the spring expands; thereby compensating for the decrease in the repulsive force of the spring as the latter lengthens. By correlating the adjustment of the spring pressure and the strength and positioning of the magnet, the resultant repulsive force acting on the diaphragm may be made substantially constant throughout the range of movement of the diaphragm or may even be made to increase as the fluid pressure drops due to a large demand on the regulator.

Another advantage inherent in this construction is the maintenance of the lock-up pressure at a low value without decreasing the operating pressure. As the diaphragm approaches its upper limit of movement, the attractive force of the magnet thereon rapidly increases, thereby overcoming the repulsive force of the spring tending to force the diaphragm to its lower position and lowering the resultant pressure against the diaphragm.

Another position in which the magnet may be located is shown in Fig. 2, wherein the magnet M is replaced by a magnet M' located in the body B and which may be either a permanent magnet or a remotely controlled electromagnet as previously described. In this embodiment of the invention, the attractive force of the magnet M' on the diaphragm means assists the repulsive force of the spring S thereon in the downward movement of the diaphragm means. It is believed obvious without further explanation that the operation of the regulator of Fig. 2 and the results achieved through the use of the magnet M' are identical to those previously described. Furthermore, with the construction shown in Fig. 2, a spring, lighter than would ordinarily be required, may be used; as, in this instance the magnet M' augments the effective diaphragm loading.

In both constructions, the movement of the diaphragm is transmitted to the arm 28, thereby effecting the movement of the valve seat 32 with respect to the inlet port 34, as in a conventional gas regulator.

Obviously, the spring-loading mechanism for the diaphragm in either of the above-described embodiments of the invention may be replaced by a weight-loading mechanism which will coact with either of the magnets M or M' in the same manner as the spring-loading mechanism to impart superior operating characteristics to the regulator. Instead of spring or weight loading the diaphragm D, a definite gas pressure may be maintained in the chamber above the diaphragm and the diaphragm loading may be varied by the use of the magnets M or M'. Also, in some cases, especially where the travel need not be great, a diaphragm of magnetic material may be employed. In this case the pans P and L need not be of magnetic material. Furthermore, as previously stated, when an electromagnet is used.

the field strength thereof may be varied by remote control in the manner described. Also, a suitable solenoid coil may be substituted for the magnets shown, and its magnetic strength controlled in a similar manner, depending upon what characteristics it is desired to impart to the regulator.

Numerous other changes may be made in the details of the apparatus disclosed, and certain features may be used apart from others, without departing from the principles of the invention or sacrificing the advantages thereof.

What is claimed is:

1. A pressure regulator comprising, in combination, a body; a cap; pressure-responsive diaphragm means secured between said body and said cap, at least a part of said diaphragm means being constructed of magnetic material; a spring mounted in said cap and bearing against said diaphragm means; and a magnet mounted within said cap with at least one pole face in directly adjacent magnetically operative relation to said part of said diaphragm means, whereby said diaphragm means is always within the magnetic field of said magnet; said magnet continuously opposing the expansive force of said spring against said diaphragm means.

2. A pressure regulator comprising, in combination, a body; a cap; pressure-responsive diaphragm means secured between said body and said cap, at least a part of said diaphragm means being constructed of magnetic material; a spring mounted in said cap and bearing against said diaphragm means; and a magnet mounted within said body with at least one pole face in adjacent magnetically operative relation to said part of said diaphragm means, whereby said diaphragm means is always within the magnetic field of said magnet; said magnet continuously augmenting the expansive force of said spring against said diaphragm means.

3. In a fluid pressure regulator, in combination, diaphragm means movable in response to the pressure of fluid passing through said regulator, at least a part of said diaphragm means being constructed of magnetic material; and loading means for said diaphragm means; said loading means including a pressure means bearing against said diaphragm means and a magnet mounted within said regulator with at least one pole face in adjacent magnetically operative relation to said part of said diaphragm means, whereby said diaphragm means is always within the magnetic field of said magnet, said pressure means and said magnet being so proportioned that the resultant loading on said diaphragm means will increase as volume of fluid passing through said regulator increases.

4. A pressure regulator comprising in combination a body; a cap; pressure-responsive diaphragm means secured between said body and said cap, at least a part of said diaphragm means being constructed of magnetic material; a spring mounted within said cap with one end bearing against said diaphragm means; pressure adjusting means mounted in said cap and engaging the opposite end of said spring; a magnet mounted within said regulator with at least one pole face in adjacent magnetically operative relation to said part of said diaphragm means, whereby said diaphragm means is within the magnetic field of said magnet throughout the range of movement of said diaphragm means; the strength of said magnet being so chosen that the effect of said magnetic field on said diaphragm means will continuously modify the effect of said spring thereon throughout the effective range of movement of said diaphragm means, to compensate for changes in the expansive force of said spring due to changes in the length thereof.

HERMAN W. CARNES.